US012085037B2

(12) United States Patent
Sakotnig et al.

(10) Patent No.: US 12,085,037 B2
(45) Date of Patent: Sep. 10, 2024

(54) CYLINDER HEAD FOR AN INTERNAL COMBUSTION ENGINE

(71) Applicant: INNIO Jenbacher GmbH & Co OG, Jenbach (AT)

(72) Inventors: Alexander Sakotnig, Telfs (AT); Stephan Laiminger, Kirchbichl (AT); Michal Knapczyk, Cracow (PL)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/029,082

(22) PCT Filed: Sep. 28, 2020

(86) PCT No.: PCT/AT2020/060347
§ 371 (c)(1),
(2) Date: Mar. 28, 2023

(87) PCT Pub. No.: WO2022/061379
PCT Pub. Date: Mar. 31, 2022

(65) Prior Publication Data
US 2023/0374951 A1 Nov. 23, 2023

(51) Int. Cl.
*F02F 1/42* (2006.01)
*F01L 3/22* (2006.01)
*F02F 1/10* (2006.01)
*F02F 1/24* (2006.01)

(52) U.S. Cl.
CPC .............. *F02F 1/4285* (2013.01); *F01L 3/22* (2013.01); *F02F 1/10* (2013.01); *F01L 2303/00* (2020.05); *F02F 2001/249* (2013.01)

(58) Field of Classification Search
CPC ...... F02F 1/4285; F02F 1/10; F02F 2001/249; F02F 2200/00; F01L 3/22; F01L 2303/00; F01P 3/02; F01P 3/314; F01P 3/16; F01P 11/04; F01P 2003/024; B33Y 80/00
See application file for complete search history.

(56) References Cited

U.S. PATENT DOCUMENTS 3,822,680 A 7/1974 Showalter et al.
11,078,865 B2 8/2021 Urzua Torres et al.
2011/0220043 A1 9/2011 Escriva et al.
(Continued)

FOREIGN PATENT DOCUMENTS

DE 10314906 B4 9/2013
DE 102016113620 A1 1/2018
(Continued)

OTHER PUBLICATIONS

PCT International Search Report and Written Opinion; Application No. PCT/AT2020/060347; dated May 28, 2021; 13 pages.

*Primary Examiner* — Grant Moubry
(74) *Attorney, Agent, or Firm* — Fletcher Yoder, P.C.

(57) ABSTRACT

A cylinder head for an internal combustion engine, wherein the cylinder head (1) comprises at least one first component part (12) and at least one second component part (13) joined to the at least one first component part (12), wherein the at least one first component part (12) is manufactured with the use of at least one of the group consisting of primary shaping, forming and cutting, wherein the at least one second component part (13) is manufactured with the use of an additive manufacturing method.

27 Claims, 6 Drawing Sheets

(56) References Cited

U.S. PATENT DOCUMENTS

| | | | | |
|---|---|---|---|---|
| 2019/0218995 | A1* | 7/2019 | Gadau | F02F 1/40 |
| 2019/0271262 | A1* | 9/2019 | Leroux | F02F 1/24 |
| 2020/0063690 | A1* | 2/2020 | Coppola | F02F 1/36 |
| 2020/0132014 | A1* | 4/2020 | Kloss | B22F 10/28 |
| 2021/0394266 | A1* | 12/2021 | Lucchetti | B22D 17/00 |
| 2022/0120210 | A1 | 4/2022 | Puschnik et al. | |

FOREIGN PATENT DOCUMENTS

| | | | | |
|---|---|---|---|---|
| DE | 102017109185 | A1 | | 10/2018 |
| DE | 102018120046 | A1 | | 2/2020 |
| DE | 102019204078 | A1 | | 10/2020 |
| IT | 102020000014458 | A | * | 6/2020 |
| JP | H05256190 | A | | 10/1993 |
| JP | H1182160 | A | | 3/1999 |
| JP | 2008286009 | A | | 11/2008 |
| WO | 2020092419 | A1 | | 5/2020 |
| WO | 2020150759 | A1 | | 7/2020 |
| WO | 2021016645 | A1 | | 2/2021 |

* cited by examiner

CYLINDER HEAD FOR AN INTERNAL COMBUSTION ENGINE

CROSS-REFERENCE TO RELATED APPLICATION

This application is a National Stage entry from, and claims benefit of, PCT Application No. PCT/AT2020/060347, filed on Sep. 28, 2020; entitled "CYLINDER HEAD FOR AN INTERNAL COMBUSTION ENGINE", which is herein incorporated by reference in its entirety.

BACKGROUND

The invention relates to a cylinder head for an internal combustion engine having the features of a classifying portion and to an internal combustion engine, preferably a reciprocating internal combustion engine, comprising such a cylinder head.

Internal combustion engines, which are known from the state of the art, are often installed with separate temperature management devices, which are designed to temperature control the internal combustion engine during an operating state with the help of a tempering medium. In this way, high thermal loads, which occur because the combustion of the internal combustion engine, can be dissipated by the temperature management device or—if required—the internal combustion engine can be heated before it is set into an operating state.

Internal combustion engines generally comprise at least one combustion chamber formed by a cylinder in which a piston slides according to a regular rectilinear movement. This rectilinear movement is then transformed into a rotation by means of a rod connecting the piston to a crankshaft.

Each cylinder is closed off in the upper part by a cylinder head. It can also be provided that a plurality of cylinders are closed in the upper part by only one single cylinder head. Cylinder heads experience large thermal and mechanical loads because they are exposed directly to the combustion in the combustion chambers.

Typical known cylinder heads from the state of the art comprise at least one inlet conduit having an inlet valve seat and at least one exhaust conduit having an exhaust valve seat. Via the at least one inlet conduit, the admission of combustion air and/or fuel can be controlled with the use of an inlet valve arranged in the at least one inlet conduit, contacting the cylinder head in a closed state at the inlet valve seat. Similarly, with the use of an exhaust valve arranged in the at least one exhaust conduit, contacting the cylinder head in a closed state at the exhaust valve seat, the evacuation of burned gases from the combustion chamber can be controlled. The valve seats are subjected to high thermal stresses, and in particular the exhaust valve seat, which is not cooled by the fresh combustion air and/or fuel, unlike the inlet valve seat.

Accordingly, the valve seats are of particular importance. If the seat-valve contact is not perfect, leakages can appear at the valve, affecting the compression ratio of the internal combustion engine and hence its efficiency, its power, its level of emission, and its durability.

To protect the cylinder head and in particular the valve seats, it is known in the state of the art to arrange a tempering circuit for tempering the cylinder head using a tempering medium in the cylinder head. Because of the mentioned special thermal loads at the valve seats, it is known to provide tempering conduits, which at least partially surround the inlet valve seat and/or the exhaust valve seat. These are manufactured using separate components, which form the valve seat and which are inserted into recesses of the cylinder head. These separate components which form the valve seat have on their outer diameter a groove, which groove forms in combination with the recess wall of the cylinder head a cavity. Alternatively or additionally, the groove can be manufactured into the recess of the cylinder head. By conveying the tempering medium through this cavity, the cylinder head (and especially the valve seats) can be effectively temperature controlled. Reference is made to US 2011/0220043 A1, U.S. Pat. No. 3,822,680 A or DE 103 14 906 B4.

Problematic therefore is that the separate part and the recess of the cylinder have to be manufactured with extremely high precisions to ensure the tightness of the tempering conduit formed between these two components. The sealing between the separate part (forming the valve seat) and the recess of the cylinder demands a lot of effort, too.

BRIEF DESCRIPTION

An aspect of certain embodiments of the invention provides a cylinder head for an internal combustion engine and an internal combustion engine comprising such a cylinder head with reduced processing and finishing requirements and/or better properties regarding the sealing of the tempering conduit, while preferably still having a compact design.

This aspect is accomplished by a cylinder head for an internal combustion engine having the features set forth in the claims, and to an internal combustion engine, preferably a reciprocating internal combustion engine, comprising such a cylinder head.

Certain embodiments of the invention include the cylinder head, wherein the cylinder head comprises at least one first component part and at least one second component part joined to the at least one first component part, wherein the at least one first component part is manufactured with the use of at least one of the group consisting of primary shaping, forming and cutting, and wherein the at least one second component part is manufactured with the use of an additive manufacturing method.

In this way, it is possible to have still a compact design of the cylinder head and at the same time to reduce the processing requirements while improving properties regarding the sealing. Certain embodiments of the invention allow for a balance between the manufacturing cost and finely tuned geometry, which is counter intuitive, as usually, the advantages of using a single manufacturing method easily outweigh the disadvantage of increasing the number of component parts. Using an additive manufacturing method decreases the number of components and of critical machining features (e.g., valve seat pockets and their tight tolerances). Furthermore, additive manufacturing methods allow geometric variants of tempering conduits, which have not been possible in past by using a mechanical shaping method (as for example milling).

According to certain embodiments of the invention, the first component part is manufactured using a manufacturing method including primary shaping, forming and/or cutting. Primary shaping, forming and cutting are to be understood to specify the manufacturing processes defined in DIN 8580, i.e., forming (German: Umformen) includes rolling, free forming, die forming, indentation forming, blasting techniques, deep drawing, hydroforming and the like. Cutting (German: Trennen) includes turning, drilling, milling, generally machining, grinding, honing and the like. Primary shaping (German: Urformen) includes different forms of casting, in particular (pressure) die casting, and certain pressing methods. However, primary shaping does not include additive manufacturing methods.

Additive manufacturing methods involve "directly" building up a work piece from a multitude of small—small in comparison with the final work piece—amounts of the material from which the work piece is produced. Additive manufacturing methods generally are "generative" in the sense that the work piece grows, e.g., in layers or other volume elements, into the finished work piece. A shaping tool, which is generally used in conventional manufacturing methods, is not necessary.

Embodiments of the invention do not exclude the use of other than additive manufacturing techniques for the additive manufactured component part for additional working steps after additively manufacturing a work piece (e.g., coating or additional machining). Additionally, before (e.g., on the materials or base) or during the additive manufacturing process other than additive manufacturing methods can be used.

Further preferred embodiments of the invention are defined in the dependent claims.

The at least one first component part and the at least one second component part can be joined together by at least one of the group consisting of an interference fit, a welded connection, a brazed connection, a positive lock, a threaded connection, and an axial mechanical load. In many cases, an interference fit (may also be called press fit) can achieve the best balance between production effort, security against disjoining and longevity.

Security against disjoining of the at least one first part and the at least one second part can be a very important factor, as a disjoining during operation most probably leads to catastrophic engine failure.

Other considerations in connection with the joint between the at least one first component part and the at least one second component part concern the matching of the materials for the at least one first component part and the at least one second component part and the location of the joint. Generally, the peak temperature gradient during operation at the location of the joint drives thermally induced stress, which should not exceed a certain value which is dependent on the materials. Therefore, the choice of material and the choice of the type of joint used is interdependent. Similar considerations apply for mechanical stresses during operation.

An easy way to realize the interference fit can be provided in that the at least one first component part comprises a cylindrical recess and the at least one second component part comprises a cylindrical portion, wherein the interference fit is created by inserting the cylindrical portion into the cylindrical recess. Of course, it would also be possible to have the cylindrical portion on the at least one first component part. However, having the cylindrical portion on the at least one second component part can help to keep the amount of material manufactured additively as low as possible.

The term "cylindrical" does not necessarily refer to a right circular cylinder, although this is the primary embodiment. The base of the cylinder can also have other shapes than circular, i.e., elliptic or polygonal.

The insertion of the cylindrical portion into the cylindrical recess can be performed in different ways and the sizing of the cylindrical portion and the cylindrical recess can determine the firmness of the joint. For example, a press can be used to introduce the cylindrical portion into the cylindrical recess and/or the cylindrical portion could be cooled to a low temperature prior to insertion.

A positive substance joint between the at least one first part and the at least one second part can be formed by additively manufacturing the at least one second component part directly onto the at least one first component part.

The at least one first component part and the at least one second component part can be releasably joined together. Since the at least one second part will usually be the one under higher thermal and mechanical loading, it may be favorable to make an exchange of the at least one second part possible while keeping the same at least one first part.

It can be provided that at least one sealing or seal is mounted between the at least one first component part and the at least one second component part.

It can be provided that at least one tempering conduit is provided in the cylinder head for tempering the cylinder head using a tempering medium.

Regarding the term "tempering," it is noted that this means to control or manage the temperature of the cylinder head or the internal combustion engine. The tempering can be in form of closed or open loop control, where also a continuous operation of the tempering circuit without explicitly setting a (constant) set point is to be understood as open loop control. The tempering circuit can be used for cooling and/or heating the cylinder head, but preferably for cooling.

The tempering medium could for example be a gas (such as air) or a liquid (such as water or oil). It is common to use cooling water of the internal combustion engine as tempering medium for the cylinder head. Such cooling water of internal combustion engines in many cases comprises additives, e.g., antifreeze agents and corrosion inhibitors.

Preferably, it is provided that the at least one tempering conduit is disposed inside an additively manufactured component part. The at least one tempering conduit is formed in its cross section by only one component part. This makes it no longer necessary to seal a cavity between two components to receive a leak-tight tempering conduit.

It can be provided that a cross section of the at least one tempering conduit changes—preferably tapers—at least partially in the vicinity of the at least one inlet conduit and/or the at least one exhaust conduit. It can also be provided that the cross section of the at least one tempering conduit tapers in a direction of flow of the tempering medium. A taper of the cross section of the at least one tempering conduit in a direction of flow of the tempering medium can help holding the tempering effect constant over the length of the at least one tempering conduit, beside a warming or cooling of the tempering medium over the length of the at least one tempering conduit. A taper of the cross section can be used for coolant velocity control and management of the velocity component of coolant pressure to better manage coolant distribution. A change of the geometry of the cross section along the flow path of the tempering medium leads to changes in velocity and pressure of the tempering medium and therefore enables better temperature control.

It can be provided that the at least one supply line is provided for supplying the tempering medium to the at least one tempering conduit. In a preferred embodiment of the invention, it can be provided that the at least one supply line enters the cylinder head centrally with respect to one cylinder of the internal combustion engine, preferably between a plurality of inlet conduits and/or exhaust conduits.

It can be provided that the at least one tempering conduit and/or the at least one supply line is configured to at least partially surround at least one pre-combustion chamber.

Preferably, it can be provided that the at least one supply line is configured to surround the at least one pre-combustion chamber in a helical manner.

Certain internal combustion engines include pre-combustion chambers. The pre-combustion chamber allows for the ignition of a smaller volume of gas-air-mixture under less lean conditions (with the pre-combustion chamber). Through a riser passage and spray passages, the ignited gas-air-mixture from the pre-combustion chamber is expelled as flame jets into a main combustion chamber of a cylinder effectively igniting the lean gas-air-mixture therein in order to ensure a stable ignition and burn inside the main combustion chamber. The pre-chamber experiences some of the highest thermal and mechanical loads of all components of an internal combustion engine.

It can be provided that the at least one tempering conduit is arranged in a vicinity of a flame deck for cooling the flame deck of the cylinder head. Therefore, it can be provided that only a section of the at least one tempering conduit is arranged in a vicinity of a flame deck for cooling the flame deck of the cylinder head.

It can be provided that the cylinder head comprises:

at least one inlet conduit having an inlet valve seat and/or at least one exhaust conduit for combustion products having an exhaust valve seat.

It can be provided that the at least one tempering conduit at least partially surrounds the inlet valve and/or the exhaust valve in one plane (section).

In a preferred embodiment of the invention, it can be provided that the cylinder head comprises an additively manufactured component part comprising all inlet valve seats and/or all exhaust valve seats of the cylinder head.

It is provided that the cylinder head is a hybrid cylinder head, wherein "hybrid" means a combination of a conventional manufactured part of a cylinder head and an additive manufactured part of a cylinder head. Preferred, the additive manufactured part is in physical interface to the conventional manufactured part.

Additively manufactured component parts can be provided for each inlet valve seat and/or exhaust valve seat or for groups of inlet valve seats and/or exhaust valve seats. In particular for large engines, there can be provided individual additively manufactured components for inlet valve seats and outlet valve seats, e.g., for each cylinder or other groupings.

It can be provided that the at least one tempering conduit is configured to surround the at least one inlet conduit and/or the at least one exhaust conduit in a spiral or helical manner.

A helical arrangement of the at least one tempering conduit yields especially good results for tempering the at least one inlet conduit and/or the at least one exhaust conduit including the respective valve seat.

In particular, traversing helically more than 360° around the valve seats delivers seat cooling free of both a zone with recirculating flow and an uncooled zone for the full 360° around the valve seat area.

It can be provided that the tempering conduit comprises at least two of the following branches:

at least one branch for tempering at least one inlet valve seat and/or at least one exhaust valve seat and/or at least one branch for tempering at least one pre-combustion chamber and/or at least one branch for tempering the flame deck of the cylinder head.

Therefore, it can be provided that the at least one first and the at least one second branch are arranged in series or in parallel. Alternatively or additionally it can be provided that the at least one first branch, the at least one second branch and/or the supply conduit have different cross sections. Further, it can be provided that the tempering conduit comprises a tapering region between the at least one first branch, the at least one second branch and/or the supply conduit.

In a particularly preferred embodiment of the invention, the supply conduit enters the cylinder head and splits up into a first and a second branch (or more), wherein the branches have a smaller diameter as the supply conduit and wherein between the supply conduit and the branches a tapering region is arranged.

BRIEF DESCRIPTION OF THE DRAWINGS

Further details and advantages of the invention are apparent from the accompanying figures and the following description of the drawings. The figures show.

DETAILED DESCRIPTION

Figure 1:
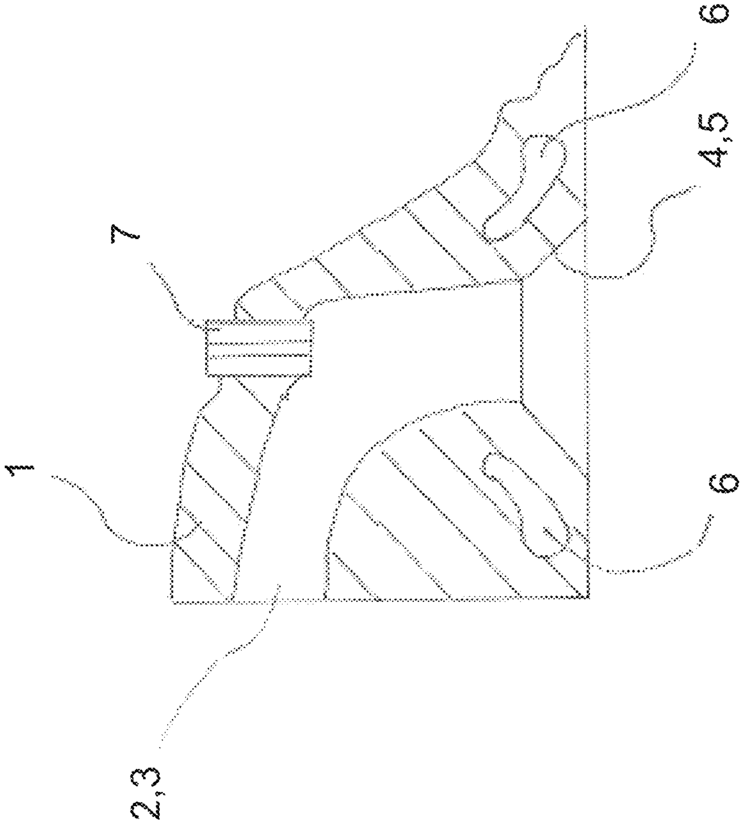
FIG. 1 is a cross-section view of part of a cylinder head according to a first embodiment of the invention.

FIG. 1 shows a cross-section through part of a cylinder head 1 according to a first embodiment of the invention. The cylinder head 1 comprises an inlet conduit 2 or exhaust conduit 3 having an inlet valve seat 4 or exhaust valve seat 5. For guiding a valve in a linear way a valve guide 7 is arranged in the cylinder head 1. A tempering conduit 6 is provided in the cylinder head 1 surrounding the inlet valve seat 4 and/or the exhaust valve seat 5. This tempering conduit 6 is configured for tempering the cylinder head 1 using a tempering medium of the tempering circuit. In this embodiment of the invention, the whole cylinder head 1 is a single monolithic additively manufactured component part.

Figure 2:
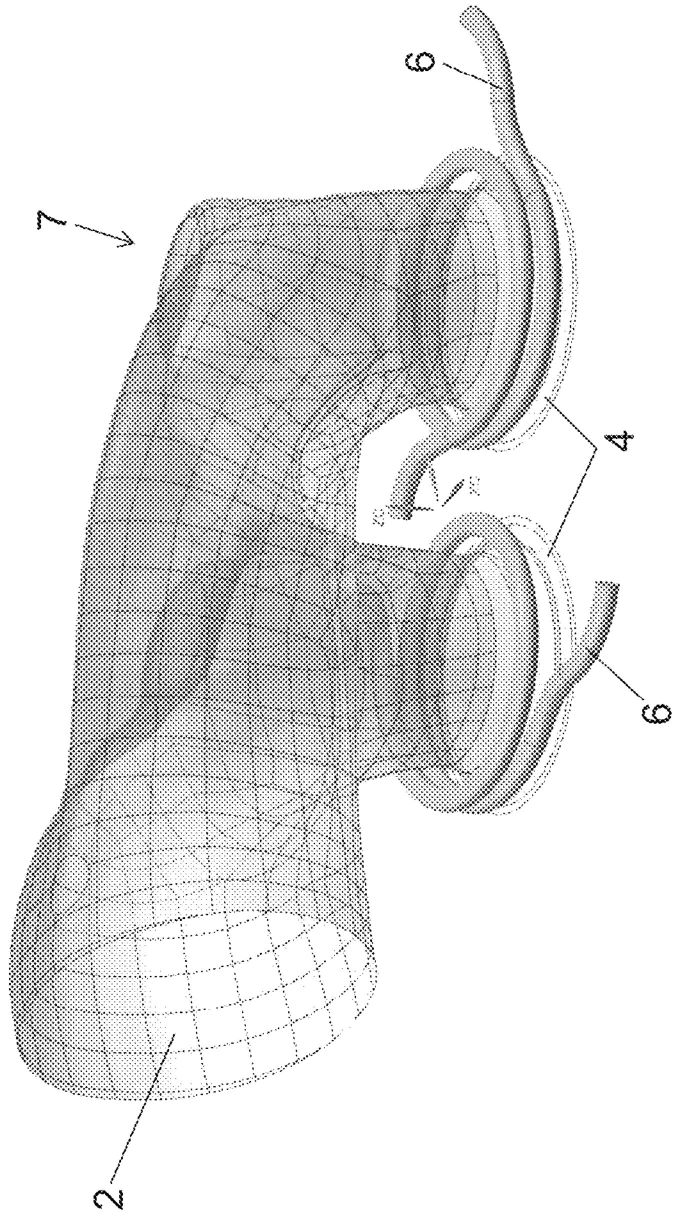
FIG. 2 is a 3D view of a tempering and supply conduit arranged according a further embodiment according to the invention.

FIG. 2 shows a 3D view of a further embodiment according to the invention. For reasons of simplicity, this Figure only shows the conduits arranged in the cylinder head 1. A single inlet conduit 2 is splitting up into two inlet valves (not shown), each having an inlet valve seat 4. A tempering conduit 6 is provided surrounding each valve seat 4. The tempering conduit 6 respectively begins near the inlet valve seat 4 and surrounds the inlet conduit 2 in a helical manner in direction of the valve guides 7. In this embodiment, the helical tempering conduit 6 comprises one and a half convolutions.

Figure 3:
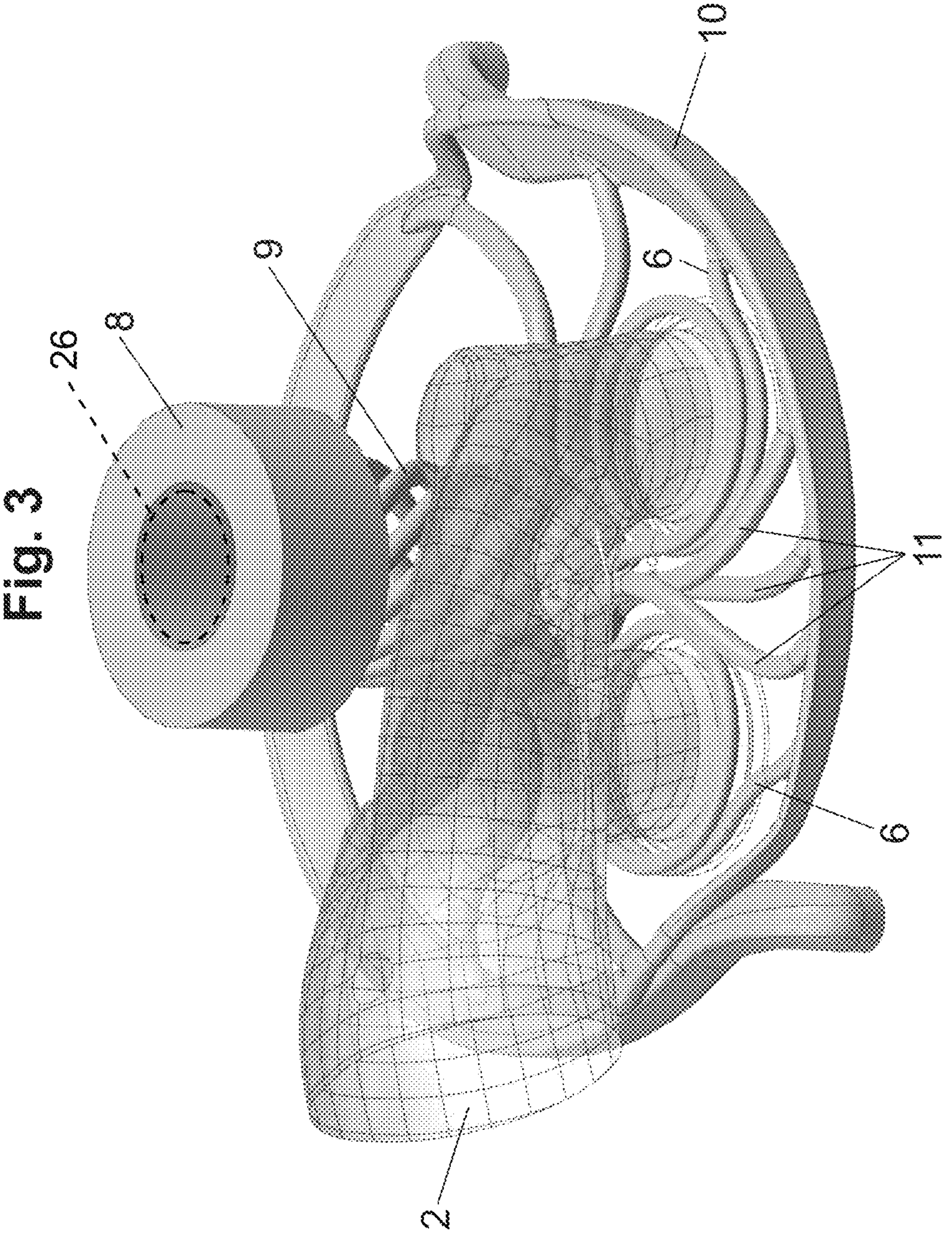
FIG. 3 is a 3D view of a tempering and supply conduit arranged according a further embodiment according to the invention.

FIG. 3 shows a 3D view of a third embodiment according to the invention. For reasons of simplicity, this Figure only shows the conduits arranged in the cylinder head 1. Similar to the previous Figure, a single inlet conduit 2 is splitting up into two inlet valves (not shown), each having an inlet valve seat 4. The inlet valve seats 4 are surrounded by tempering conduits 6, surrounding the inlet valve seats 4 and the ensuring portion of the inlet conduit 2 in a helical manner.

With the help of a supply conduit 8, the tempering conduits 6 are supplied with a tempering medium. The supply conduit 8 is provided with a helical portion 9, which surrounds a pre-combustion chamber 26 arranged in the cylinder head 1 in a helical manner. Parallel to the tempering conduits 6, further tempering conduits 11 are arranged for tempering the remaining cylinder head 1. After passing through the tempering conduits 6 and the further tempering conduits 11, the tempering medium is lead to an outflow conduit 10, which outflow conduit 10 leads the tempering medium to an exit point of the cylinder head 1. The outflow conduit 10 tapers in this embodiment in a flow direction of the tempering medium to keep a constant flow speed of the tempering medium.

Figure 4:
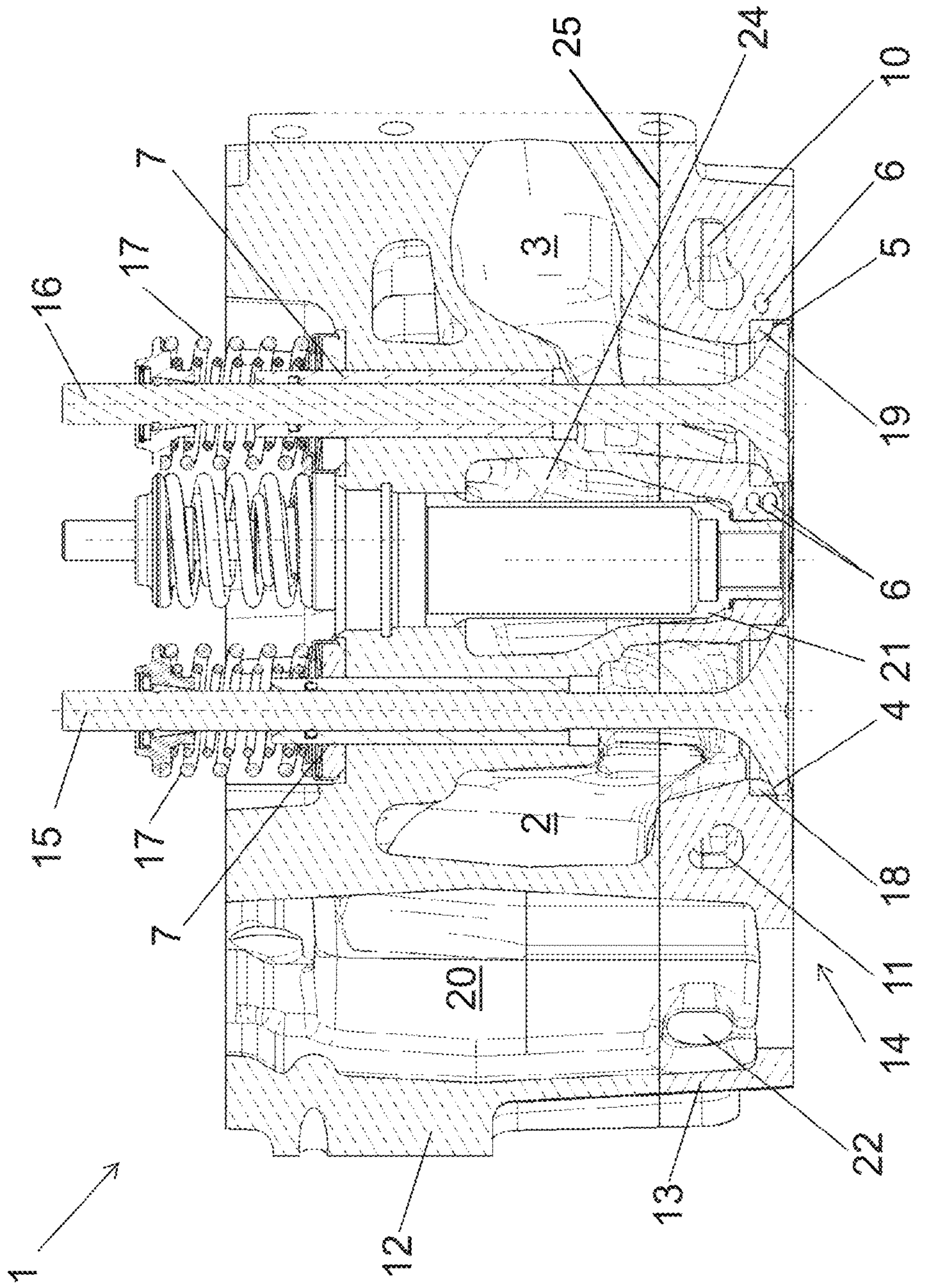
FIG. 4 illustrates a first embodiment of a cylinder head according to the invention.

FIG. 4 represents a cylinder head 1 comprising a first component part 12 and a second component part 13, wherein the first component part 12 forms the base body of the cylinder head 1 and the second component part 13 comprises the flame deck 14 of the cylinder head 1.

The first component part 12 of the cylinder head 1 is manufactured by use of primary shaping, wherein the first component part 12—as known in the prior art—is formed by aluminium casting and is afterwards processed by a cutting process (e.g., by a milling process and/or turning process).

In the first component part 12, valve guides 7 are provided for guiding the inlet valves 15 and the outlet valves 16. On top (at the side of the first component part 12 facing away from the combustion chamber) of the first component part 12, the valve springs 17 and the valve actuation are arranged. The valve actuation (e.g., cams and camshaft) are not shown.

The second component part 13 of the cylinder head 1 is manufactured with the use of an additive manufacturing method.

The inlet valve seat 4 is formed in this embodiment by a separate inlet valve seat insert 18. Also, the exhaust valve seat 5 is formed by a separate exhaust valve seat insert 19. The valve seat inserts 18, 19 can be formed by separate additively manufactured component parts.

Furthermore, the first component part 12 comprises a part of the inlet conduit 2 and a part of the exhaust conduit 3 (namely the main part of the inlet conduit 2 and the exhaust conduit 3 except the respective end portions in the region of the valve seats 4, 5).

A main supply conduit 20 is arranged in the first component part 12 of the cylinder head 1 supplying a tempering medium to the regions of the cylinder head 1 and the cylinder liner, which have to be tempered (in the sense that the temperature of the same needs to be managed using the cooling medium).

The main supply conduit 20 further delivers tempering medium for tempering the cylinder liner, wherein the main supply line 20 starting from the first component part 12 leads through the second component part 13 and passes over to the engine block and/or the cylinder liner. The main supply conduit 20 supplies cooling medium to the cylinder head 1 and to further components of the internal combustion engine. Therefore, the main supply conduit 20 serves as the supply conduit 8 for the cylinder head 1 according to certain embodiments of the invention.

Within the first component part 12, the supply conduit 8/main supply conduit 20 branches for tempering the spark plug sleeve 21, wherein the spark plug sleeve tempering cavity 24 between the first component part 12 and the spark plug sleeve 21 is provided with tempering medium (e.g., water as main component).

The spark plug sleeve 21 is adapted to receive the spark plug, which is not shown. Alternatively or additionally a pre-chamber is provided, wherein the supply conduit 8/main supply conduit 20 would provide tempering medium for tempering the pre-chamber and/or the pre-chamber gas valve and/or the spark plug and/or the spark plug sleeve 21.

The second component part 13 comprises a further supply conduit 22, which branches off the main supply conduit 20 and feeds the tempering system of the second component part 13.

Starting from the main supply conduit 20, the further supply conduit 22 channels tempering medium across or around (i.e., around a central axis of the cylinder/cylinder head 1) the second component part 13, wherein the second component part 13, in particular the flame deck 14, can be tempered, preferably cooled.

The further supply conduit 22 also provides the further tempering conduits 11 with tempering medium. The further tempering conduits 11 can be provided—as already disclosed by FIG. 3—for supplying tempering medium to the tempering conduit 6, which is arranged in a spiral manner around the exhaust valve seat 5.

In this specific embodiment of FIG. 4, only tempering conduits 6 are provided around the exhaust valve 16, the exhaust valve seat 5 and at least a part of the exhaust conduit 3. Alternatively or additionally, such tempering conduits 6 can also be provided around the inlet valve 15, the inlet valve seat 4 and at least a part of the inlet conduit 2 (as shown, e.g., by FIG. 6).

After passing through the tempering conduits 6 and the further tempering conduits 11, the tempering medium is lead to an outflow conduit 10, which outflow conduit 10 leads the tempering medium to an exit point of the cylinder head 1.

The first component part 12 and the second component part 13 are joined together by at least one of the group consisting of an interference fit, a welded connection, a brazed connection, a positive lock, positive substance jointing, a threaded connection, and an axial mechanical load.

Figure 5:
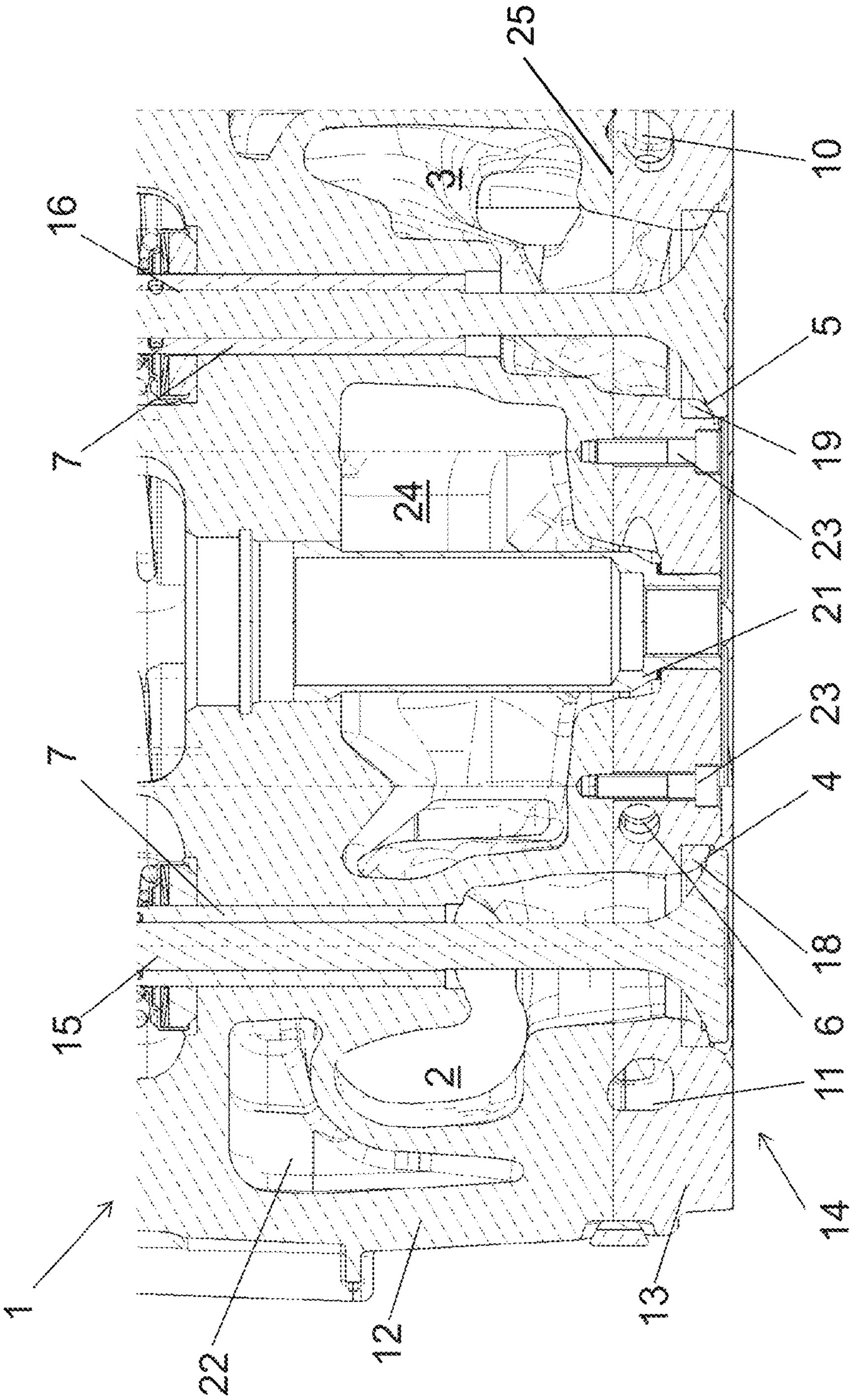
FIG. 5 illustrates a second embodiment of a cylinder head according to the invention.

FIG. 5 shows a second embodiment of a cylinder head 1 having a first component part 12 and a second component part 13 similar to the embodiment of FIG. 4.

Figure 6:
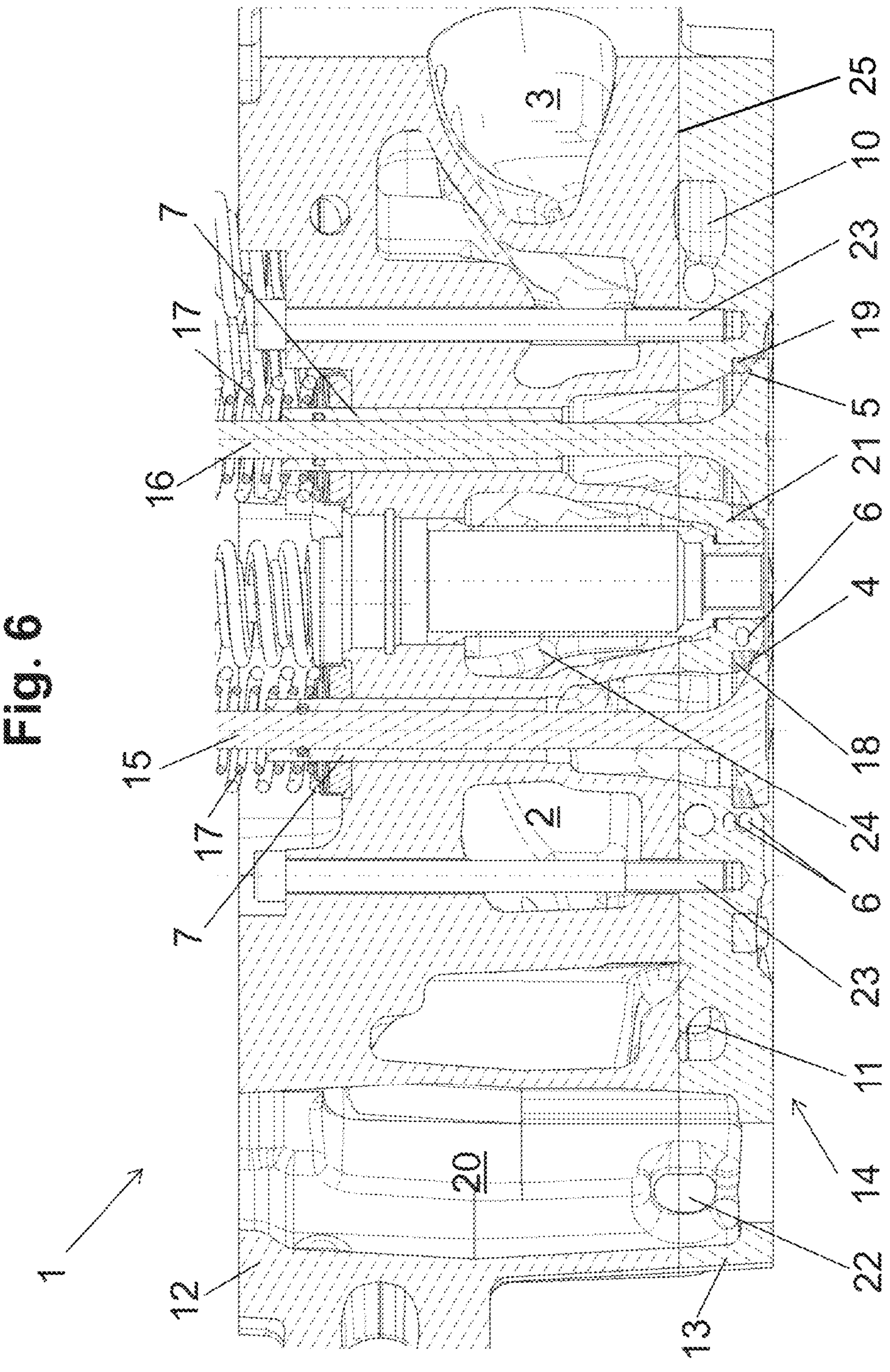
FIG. 6 illustrates a third embodiment of a cylinder head according to the invention.

By comparison to FIG. 4, the tempering conduits 6 of the embodiment shown by FIG. 6 do not surround the valves or the valve seats. The tempering conduits 6 are arranged in this embodiment across the second component part 13 for tempering—preferably cooling—the whole flame deck 14.

The second component part 13 of this embodiment is fixed to the first component part 12 by use of screws 23, wherein the screws 23 are screwed in in the periphery of the cylinder from a side facing the combustion chamber in a mounted state of the cylinder head 1 at the internal combustion engine.

FIG. 6 shows a third embodiment of a cylinder head 1 having a first component part 12 and a second component part 13 similar to the embodiment of FIG. 4.

By comparison to FIG. 4, the tempering conduits 6 of the embodiment shown by FIG. 6 surround the inlet valve 15, the inlet valve seat 4 and at least a part of the inlet conduit 2.

The second component part 13 of this embodiment is fixed to the first component part 12 by use of screws 23, wherein the screws 23 are screwed in in the periphery of the cylinder from a side facing away from the combustion chamber in a mounted state of the cylinder head 1 at the internal combustion engine. It can be provided that at least one sealing or seal 25 is mounted between the first component part 12 and the second component part 13 of FIGS. 4, 5, and 6.

REFERENCE SIGNS

1 cylinder head
2 inlet conduit
3 exhaust conduit
4 inlet valve seat
5 exhaust valve seat
6 tempering conduit
7 valve guide
8 supply conduit
9 helical portion
10 outflow conduit
11 further tempering conduits
12 first component part
13 second component part
14 flame deck
15 inlet vale
16 exhaust valve
17 valve spring
18 inlet valve seat insert
19 exhaust valve seat insert
20 main supply conduit
21 spark plug sleeve
22 further supply conduit
23 screw
24 spark plug sleeve tempering cavity
25 seal
26 pre-combustion chamber

The invention claimed is:

1. A system, comprising:

a cylinder head for an internal combustion engine, wherein the cylinder head comprises at least one first component part and at least one second component part joined to the at least one first component part, wherein the at least one first component part is a non-additively manufactured part, wherein the at least one second component part is an additively manufactured part; and at least one seal is mounted between the at least one first component part and the at least one second component part.

2. The system of claim 1, wherein the at least one first component part and the at least one second component part are joined together by at least one of an interference fit, a welded connection, a brazed connection, a positive lock, positive substance jointing, a threaded connection, and an axial mechanical load.

3. The system of claim 1, wherein the at least one second component part is additively manufactured directly onto the at least one first component part.

4. The system of claim 1, wherein the at least one first component part and the at least one second component part are removably coupled together via one or more fasteners.

5. The system of claim 1, comprising a reciprocating internal combustion engine having the cylinder head.

6. The system of claim 1, wherein at least one tempering conduit is disposed in the cylinder head for tempering the cylinder head using a tempering medium, and the at least one tempering conduit is disposed inside the second component part.

7. The system of claim 1, wherein at least one tempering conduit is disposed in the cylinder head for tempering the cylinder head using a tempering medium, and a cross section of the at least one tempering conduit tapers in a direction of flow of the tempering medium.

8. The system of claim 1, wherein at least one tempering conduit is disposed in the cylinder head for tempering the cylinder head using a tempering medium, and at least one supply conduit is provided for supplying the tempering medium to the at least one tempering conduit, wherein the at least one tempering conduit and/or the at least one supply conduit is configured to at least partially surround at least one pre-combustion chamber.

9. The system of claim 1, wherein at least one tempering conduit is disposed in the cylinder head for tempering the cylinder head using a tempering medium, and at least one supply conduit is provided for supplying the tempering medium to the at least one tempering conduit, wherein the at least one supply conduit is configured to surround at least one pre-combustion chamber in a helical manner.

10. The system of claim 1, wherein at least one tempering conduit is disposed in the cylinder head for tempering the cylinder head using a tempering medium, and the at least one tempering conduit is arranged in a vicinity of a flame deck for cooling the flame deck of the cylinder head.

11. The system of claim 1, wherein the cylinder head comprises:

at least one inlet conduit for air and/or fuel having an inlet valve seat, and/or at least one exhaust conduit for combustion products having an exhaust valve seat.

12. The system of claim 1, wherein the second component part comprises all inlet valve seats and/or all exhaust valve seats of the cylinder head.

13. The system of claim 1, wherein separate additively manufactured component parts are provided for each inlet valve seat and/or exhaust valve seat or for groups of inlet valve seats and/or exhaust valve seats.

14. The system of claim 1, wherein at least one tempering conduit is disposed in the cylinder head for tempering the cylinder head using a tempering medium, and the at least one tempering conduit is configured to at least partially surround an inlet valve seat and/or an exhaust valve seat in a helical manner.

15. A system, comprising:

a cylinder head for an internal combustion engine, wherein the cylinder head comprises at least one first component part and at least one second component part joined to the at least one first component part, wherein the at least one first component part is a non-additively manufactured part, wherein the at least one second component part is an additively manufactured part; and at least one tempering conduit is disposed in the cylinder head for tempering the cylinder head using a tempering medium, wherein the at least one tempering conduit comprises at least two of the following branches:

at least one branch for tempering at least one inlet valve seat and/or at least one exhaust valve seat, and/or at least one branch for tempering at least one pre-combustion chamber, and/or at least one branch for tempering a flame deck of the cylinder head.

16. The system of claim 15, wherein the at least two branches and/or a supply conduit have different cross sections.

17. The system of claim 15, wherein the tempering conduit comprises a tapering region between the at least two branches and/or a supply conduit.

18. A method, comprising:

forming at least one first component part of a cylinder head for an internal combustion engine via a non-additive manufacturing process; and forming at least one second component part of the cylinder head comprising a spiral passage via an additive manufacturing process.

19. A method, comprising:

coupling together at least one first component part and at least one second component part of a cylinder head of an internal combustion engine, wherein the at least one first component part is not additively manufactured, and the at least one second component part is additively manufactured; and mounting at least one seal between the at least one first component part and the at least one second component part.

20. The method of claim 19, comprising removing coupling together the at least one first component part and the at least one second component part via one or more fasteners.

21. The method of claim 19, wherein the at least one second component part is additively manufactured to include a spiral passage.

22. The method of claim 21, wherein the spiral passage extends around at least one of an inlet conduit, an exhaust conduit, an inlet valve seat, an exhaust valve seat, a pre-combustion chamber, or a combination thereof.

23. The method of claim 18, wherein the spiral passage extends around at least one of an inlet conduit, an exhaust conduit, an inlet valve seat, an exhaust valve seat, a pre-combustion chamber, or a combination thereof.

24. A system, comprising:

a cylinder head for an internal combustion engine, wherein the cylinder head comprises at least one first component part and at least one second component part joined to the at least one first component part, wherein the at least one first component part is a non-additively manufactured part, wherein the at least one second component part is an additively manufactured part forming at least one tempering conduit that extends in a circumferential direction at least partially around an inlet conduit, an exhaust conduit, an inlet valve seat, an exhaust valve seat, a pre-combustion chamber, or a combination thereof.

25. The system of claim 24, wherein the at least one tempering conduit comprises a spiral conduit.

26. The system of claim 24, wherein the at least one tempering conduit comprises a plurality of tempering conduits disposed about a plurality of the inlet conduit, the exhaust conduit, the inlet valve seat, the exhaust valve seat, the pre-combustion chamber, or a combination thereof.

27. The system of claim 24, wherein the at least one tempering conduit extends in the circumferential direction more than 360 degrees around the inlet conduit, the exhaust conduit, the inlet valve seat, the exhaust valve seat, the pre-combustion chamber, or the combination thereof.

* * * * *